Patented Nov. 9, 1926.

1,606,216

UNITED STATES PATENT OFFICE.

CHRISTIAN J. GAMBEL, OF NEW ORLEANS, LOUISIANA.

PROCESS OF REFINING SUGAR WITH CARBROX.

No Drawing.   Application filed May 13, 1922.   Serial No. 560,778.

This invention relates to a process of refining raw sugar, and has for its object to improve the efficiency and to lessen the cost of the procedures heretofore proposed.

With these and other objects in view, the invention consists in the novel steps and combinations of steps constituting the process, all as will be more fully hereinafter disclosed and particularly pointed out in the claims.

In order that the precise invention may be the more clearly understood, it is said:

As practiced in refineries without this invention, it is customary to wash the raw sugar by means of centrifugally acting washing machines, to melt the raw sugar by adding 50% of its weight of water thereto, to then pump the melt into clarifiers, where lime and "Filter-Cel" or other inert finely divided filtering material is added in order to precipitate all of the coloring matter possible, and from the clarifiers the solution passes through suitable filter presses, preferably of the Sweetland type, whence the filtered solution passes over bone black, and from there it passes into the vacuum pans where it is concentrated to a degree sufficient for the making of refined white sugar. But, as is well known, a large proportion of the cost of refining resides in the cost of the bone black plant. That is, an average sized refinery may very well have an investment of a million dollars locked up in its bone black plant, for it requires from 75 pounds to 100 pounds of bone black, and sometimes more, for each 100 pounds of sugar refined, and the upkeep and waste of the bone black is a considerable item in addition to the interest on the money invested. It therefore follows that any change in the process by which the same product can be obtained at a less investment, in bone black, is a very desirable progress in this art.

In carrying out this invention, I not only am enabled to lessen the investment in the bone black, but I am enabled to effect other desirable results, as will now be set forth. In carrying out this invention, I follow the old processes until after the solution passes the filtering apparatus, except I prefer to omit the washing step altogether, and carry the coloring matter, etc., which was heretofore removed by the washing plant, into the clarifiers. After the solution passes the filter process, instead of carrying it to the bone black as heretofore, I carry said solution into an agitating plant somewhat similar to the clarifying plant, where "Carbrox" in a sufficient quantity to effect the desired decolorization is added to said solution. That is, I may use, say, from 1 to 4 pounds or somewhat more, of "Carbrox" to each 100 pounds of sugar, according to how much I wish to lessen the investment in bone black, all as will be more particularly referred to hereinafter.

I should say that as is disclosed in the British Patent No. 116,253, dated July 26, 1918, to Shilstone "Carbrox" is a decolorizing carbon derived from the charring of rice hulls out of contact with the air, then grinding the same and boiling the ground material in caustic soda to remove a large proportion of the siliceous matter present. These hulls are charred preferably at temperatures above those required to remove all the moisture present, and as high as can be economically maintained in the furnace. After this ground and treated material is dried it may then be added to said agitating plant in its finely divided condition, whereupon the temperature is maintained at, say, 190° F. and the contents are agitated for about ½ hour, or until the desired action is had. From the agitator, the sugar liquor is again passed through the filtering apparatus, and the filtrate from this second treatment is then passed over the bone black, and the resulting liquor or syrup is passed to the vacuum pans and concentrated to a degree sufficient for making white refined sugar.

The advantages of this treatment will be readily appreciated when it is said: One gets a greater decolorization from the "Carbrox" the greater the amount of "Carbrox" used, and therefore he is enabled, by using enough "Carbrox," to entirely do away with the bone char plant. In fact, it is found that if about 4 pounds or somewhat more, of "Carbrox" is employed to each 100 pounds of sugar present, no bone char at all need be used.

It therefore results that one is enabled in following this procedure to adopt that particular proportion of "Carbrox" and bone black which practice shows to possess economically the highest advantage. But in addition to this advantage, a still further important feature of this invention resides in the fact that "Carbrox" itself may be used over and over again, without revivification, owing to the absence of abnormal quantities of insoluble coloring matter in the already filtered sugar solution being treated. That is, not withstanding the fact that the washing machine may have been eliminated in the process, yet these said impurities are largely caught in the filters employed in the first filtering process, and therefore said impurities are kept away from the "Carbrox," thus enabling one to use the "Carbrox" for that function for which it is best adapted, namely, to take out color rather than the impurities present. In other words, a little consideration will show that suspended impurities will clog up the "Carbrox" very much more quickly than will the impalpably more finely divided coloring matter.

A still further important feature of the invention resides in the fact that the sugar solutions may be maintained in an alkaline condition throughout the process of refining, and thus lessen to a minimum the losses due to inversion. A still further advantage of the process resides in the fact that by doing away with the washing plant, one not only saves the cost of operation of the same, but since he does not separate out the impurities and other colored matter in said washing machine, which go to make up black strap and inferior grades of molasses, but on the other hand, carries said impurities into the clarifiers along with their accompanying sugar content, he is enabled to eliminate entirely the production of said black strap and other inferior grades of molasses. That is, he separates in the clarifiers and in the filters the colored impurities which make up the inferior grades of molasses from the molasses syrups present, and he accordingly only makes very high grades of molasses or syrups. And further, since there are comparatively small quantities of inverted sugar present, largely owing to the alkaline condition of the solution, only relatively small quantities of molasses or syrups are made.

It thus results that the output of sugar is a maximum when following this process. Of course, the foregoing process is also applicable to washed sugar, and as it is obvious that those skilled in the art may vary the details of the procedure without departing from the spirit of the invention, I do not wish to be limited to the above disclosure except as may be required by the claims.

What I claim is:—

1. The process of refining sugar which consists in clarifying and filtering a solution of sugar; subjecting the filtrate in an agitator to the action of a quantity of "Carbrox" equal to as little as three fourths of a pound to each one hundred pounds of sugar present to partially decolorize the same; subjecting the partially decolorized solution to a second filtering action; and producing refined white sugar in the manner well known from the second filtrate thus obtained, substantially as described.

2. The process of refining sugar which consists in clarifying and filtering a solution of sugar; subjecting the filtrate in an agitator to the action of a quantity of "Carbrox" equal to as little as a pound to each one hundred pounds of sugar present to partially decolorize the same; maintaining the solution in an alkaline condition; subjecting the partially decolorized solution to a second filtering action; and producing refined white sugar in the manner well known from the second filtrate thus obtained, substantially as described.

3. The process of refining sugar which consists in clarifying and filtering a solution of sugar in an alkaline condition; subjecting the filtrate in an agitator to the action of a quantity of "Carbrox" equal to as little as one and one half pounds to each one hundred pounds of sugar present to partially decolorize the same; subjecting the partially decolorized solution to a second filtering action; and producing refined white sugar in the manner well known from the second filtrate thus obtained, substantially as described.

4. The process of refining sugar which consists in clarifying and filtering a solution of raw sugar; subjecting the filtrate in an agitator to the action of a quantity of "Carbrox" equal to as little as two pounds to each one hundred pounds of sugar present to partially decolorize the same; subjecting the partially decolorized solution to a second filtering action; subjecting the second filtrate to a second decolorizing action; and making refined white sugar from the said decolorized second filtrate, substantially as described.

5. The process of refining sugar which consists in clarifying and filtering an alkaline solution of raw sugar; subjecting the filtrate in an agitator to the action of a quantity of "Carbrox" equal to as little as two and one half pounds to each one hundred pounds of sugar present to partially decolorize the same; subjecting the partially decolorized solution to a second filtering action; subjecting the second filtrate to a second decolorizing action in the presence of bone black; and making refined white sugar from the said decolorized second filtrate, substantially as described.

6. The process of refining sugar which consists in clarifying and filtering a solution of unwashed raw sugar; subjecting the filtrate in an agitator to the action of heat and to a quantity of "Carbrox" equal to as little as three pounds to each one hundred pounds of sugar present to partially decolorize the same; subjecting the partially decolorized solution to a second filtering action; subjecting the second filtrate to a second decolorizing action; and making refined white sugar from the said decolorized second filtrate, substantially as described.

7. The process of refining sugar which consists in subjecting a sugar solution in an alkaline condition to the action of a clarifier in the presence of lime and "Filter-Cel;" filtering said solution; subjecting the filtrate to the action of heat and an agitator in the presence of as little as three and one half pounds of "Carbrox" to each one hundred pounds of sugar present; again filtering said solution; and making refined sugar therefrom, substantially as described.

8. The process of refining sugar which consists in subjecting a solution of unwashed raw sugar to the action of a clarifier in the presence of lime and "Filter-Cel;" filtering said solution; subjecting the filtrate to the action of heat and an agitator in the presence of as little as four pounds of "Carbrox" to each one hundred pounds of sugar present; again filtering said solution; and making refined sugar therefrom, substantially as described.

9. The process of refining sugar which consists in subjecting a solution of sugar in an alkaline condition to the action of a clarifier; filtering said solution; subjecting the filtrate to the action of heat and an agitator in the presence of as litle as three and three-fourths pounds of "Carbrox" to each one hundred pounds of sugar present; again filtering said solution; and making refined sugar therefrom, substantially as described.

10. The process of refining sugar which consists in subjecting a solution of raw sugar in an alkaline condition to the action of a clarifier; filtering said solution; subjecting the filtrate to the action of heat and an agitator in the presence of as little as three-fourths of a pound of "Carbrox" to each one hundred pounds of sugar present; again filtering said solution; and making refined sugar therefrom, substantially as described.

11. The process of refining sugar which consists in subjecting a sugar solution containing those impurities which are usually removed by a washing action to the action of a clarifier in the presence of lime and a filtering medium; filtering out said impurities; subjecting the filtrate to the action of heat and an agitator in the presence of as little a quantity of "Carbrox" to each one hundred pounds of sugar present as will decolorize said solution; again filtering said solution; and making refined sugar from the filtrate thus produced.

In testimony whereof I affix my signature.

CHRISTIAN J. GAMBEL.